Patented Sept. 29, 1953

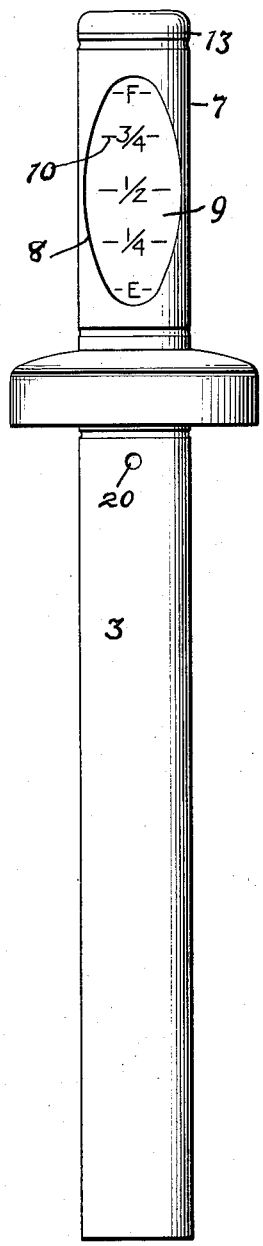
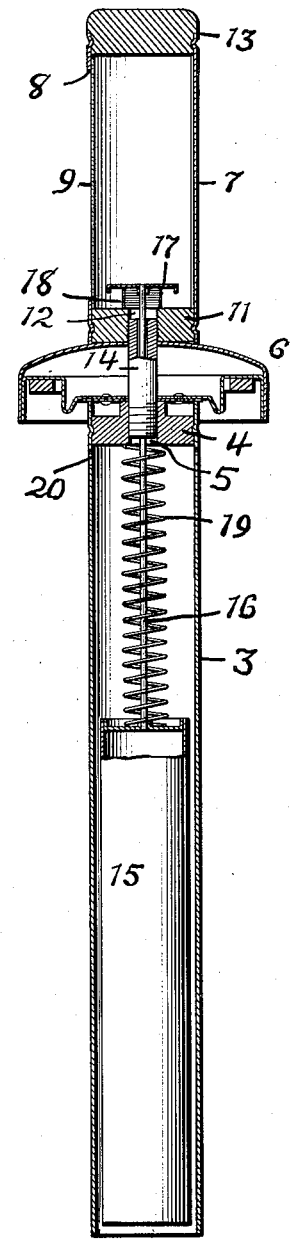
Fig. 1
Fig. 2
INVENTOR.
Robert W. Harper

2,653,478

UNITED STATES PATENT OFFICE 2,653,478

GAUGE FOR LIQUID CONTAINERS

Robert W. Harper, Fort Wayne, Ind.

Application August 30, 1949, Serial No. 113,070

6 Claims. (Cl. 73—309)

This invention relates to improvements in a gauge for liquid containers of the type having an apertured housing atop the fill-cap for the container and a float chamber suspended in the container from the cap and provided with a spring-supported indicating means visible through the aperture of the housing by which to determine the quantity of liquid in the container.

Various devices have been produced by which to indicate the quantity of liquid in a container operated by a float and generally the parts of the indicating mechanism are attached to the container and are difficult to remove for inspection or repair.

An object of the present invention is to afford a liquid indicating gauge mounted in connection with and supported by the fill-cap of a liquid container that is bodily removable together with the fill-cap and replaceable, and which is restored to its operating position when the fill-cap is closed.

Another object of the invention is to provide stabilizing means for the indicator thus to prevent irregular movement thereof.

And a further object of the invention is to provide means for reducing the normal stroke of the indicator relative to the rise and fall of the liquid in the container.

Other objects and advantages of the invention appear in the following description.

An illustrative embodiment of the invention is shown in the accompanying drawings, in which:

Fig. 1 is a rear elevational view of a structure in which the invention is incorporated; and Fig. 2 is a vertical central section of the structure shown in Fig. 1 in a plane at right angles thereto.

The invention consists of a tubular float chamber 3 open at its bottom and having in its upper end a head 4 secured in any suitable manner therein and provided with a concentric threaded opening 5. Upon the top of the float chamber is disposed a fill-cap 6 of an ordinary type used for closing the fill opening of a fuel tank or other liquid container (not shown), and upon the top of the fill-cap is positioned a tubular housing 7 having a sight opening 8 therein which is closed by a transparency 9 bearing indicia 10. The lower end of the housing has secured therein another head 11 provided with a concentric threaded opening 12 and the housing is closed at its top by a cover 13.

The float chamber 3 and the housing 7 are secured to the fill-cap 6 by means of a threaded nipple 14 that extends through the fill-cap with its ends extending into and engaging the corresponding heads 4 and 11, thus holding the float chamber and housing in axial alinement with the fill-cap.

An indicating mechanism is provided which includes a closed float 15, disposed within the float chamber 3, and provided with a stem 16 that extends loosely through the nipple 14 into the housing 7, which has secured on its upper end a transversely disposed indicator-plate 17 that has vertical movement, relative to the indicia on the transparency 9, as the float rises and falls.

An expansion coil spring 18 is loosely disposed concentrically on the stem 16 between the indicator-plate 17 and the head 11 in the housing, and when completely collapsed definitely limits downward movement of the indicator-plate, whereupon the float is held suspended by its stem 16 in the float chamber. There is also a compression coil spring 19 disposed concentrically around the stem between the float 15 and the head 4 in the upper end of the float chamber, which tends to retard upward travel of the float and thus reduces the range of movement of the indicator mechanism.

The upper end portion of the float chamber, beneath the head 4 therein, has a vent opening 20 to permit egress or ingress of air with respect to the chamber as liquid from the container enters or recedes in the float chamber.

In using the invention the device as a complete unit is bodily removed from the liquid container by opening the fill-cap, and is replaced into operating position by closing the fill-cap on the container. According to the level of liquid in the container the stem is raised upwardly into the housing due to buoyancy of the float in the float chamber under restraint of the compression spring and urge of the expansion spring.

A feature of the invention is the provision of the expansion spring which serves the dual purpose of limiting, when completely collapsed, downward movement of the indicator so the indicator plate is level with the bottom of the indicia visible through the sight opening, and of counterbalancing the weight of the float and its stem when the float is in its lowermost position and the restraining force of the compression spring 19 is substantially exhausted. In this manner, because of re-action of the expansion spring, upward movement of the indicator is begun upon the slightest submersion of the float which augments accuracy of the indicator mechanism.

Variations from the particular construction above disclosed may be resorted by the exercise of skill in the art, without departure from the spirit or scope of the invention.

What I claim is:

1. A gauge for a liquid container, comprising a fill-cap for the container, a tubular housing disposed atop the fill-cap and having an apertured disc-like member in its lower end, a tubular float chamber adapted to extend into the container and having an apertured disc-like member in its upper end, a tubular member extending through said fill-cap and cooperating with said disc-like members for connecting the housing, fill-cap and float chamber together in axial alignment, said housing having a sight opening and indicia, and an indicating mechanism including a buoyancy type float disposed within said chamber, said float being subject to immersion in the liquid of the container in varying depths in accordance with changes in the depth of said liquid, a stem carried by said float and extending loosely through said tubular member into the housing, the upper end of the stem providing indicating means visible through said sight opening, a spring concentrically disposed relative to the stem and cooperating with said indicating mechanism to limit downward movement of the indicating mechanism, and a compression spring concentrically disposed around the stem between the float and the disc-like member in the upper end portion of the float chamber by which buoyancy of the float is yieldingly restrained, thus to reduce the range of the indicating mechanism.

2. A gauge for a liquid container, consisting of a unit in which is included a fill-cap for the container, a tubular housing disposed atop the fill-cap, a head member in the lower end of said housing, a tubular float chamber extending into the container, a nipple extending through said fill-cap connecting the housing, fill-cap and float chamber together in axial alinement, said housing having a sight opening and a transparency closing said opening provided with indicia thereon, and an indicating mechanism including a buoyancy type float disposed within said chamber, said float being subject to immersion in the liquid of the container in varying depths in accordance with changes in the depth of said liquid, a stem connected to said float and extending loosely through said nipple into the housing, said stem having secured on its upper end an indicator-plate visible through said sight opening, an expansion spring concentrically disposed about the stem between the indicator-plate and said head in the lower end of the housing adapted, when collapsed, to limit downward movement of the indicator plate, a head member in the upper end of said float chamber, and a compression spring concentrically disposed around the stem between said float and said head in the upper end portion of the float chamber and in continuous contact with both, by which buoyancy of the float is continually and yieldingly restrained, thus to reduce the range of the indicating mechanism.

3. A gauge, applicable to a liquid container, consisting of a tubular housing provided with a sight opening therein and a transparency closing said opening having indicia thereon, said housing being disposed atop the fill-cap for the container, a head member in the lower end of said housing, a tubular float chamber having a vent opening in its upper end portion and dependently secured to said fill-cap so as to project into the container, and an indicating member including a buoyancy type float suspended in said chamber, said float being subject to immersion in the liquid of the container in varying depths in accordance with changes in the depth of said liquid, a stem connected to said float and extending loosely through the fill-cap into the housing provided with a transversely disposed indicator-plate secured on its top, an expansion spring interposed between the indicator-plate and said head member in the lower end of said housing and adapted, when completely collapsed, to definitely limit the downward stroke of the indicating member, a head member in the upper end of said float chamber, and a compression spring disposed between the float and said head member in the upper end of said float chamber and in continuous contact with both, adapted to continually and yieldingly restrain the buoyant tendency of the float when raised by inflow of liquid from the container into the float chamber.

4. In a gauge for a liquid container, said gauge consisting of a fill-cap for the container, a tubular housing secured atop the fill-cap provided with a sight opening and a transparency closing said opening that has indicia thereon, a head member in the lower end of said housing, a tubular float chamber secured to the bottom of the fill-cap extending into the container, a buoyancy type float in said chamber, said float being subject to immersion in the liquid of the container in varying depths in accordance with changes in the depth of said liquid, a stem connected to said float that extends loosely through said fill-cap into said housing provided with an indicator-plate secured on its top, an expansion spring in the housing disposed about the upper portion of said stem and between said indicator-plate and said head member in the lower end of said housing, and a compression spring disposed about the lower portion of said stem and between said float and the upper end of the float chamber and in continuous contact with both, continually and yieldingly restraining upward movement of the float.

5. A gauge for a liquid container consisting of a fill-cup for the container provided with a housing secured on its top and a float chamber secured to its bottom that extends into the container, said float chamber being open at its bottom and provided with a vent opening in its upper end portion, a buoyancy type float disposed in said chamber, said float being subject to immersion in the liquid of the container in varying depths in accordance with changes in the depth of said liquid, a stem connected to said float that extends loosely through said fill-cap into said housing and which has secured on its top an indicator-plate visible through a sight opening in said housing, an expansion spring in said housing disposed about the upper portion of said stem and acting upwardly against said indicator-plate to limit downward movement thereof when said expansion spring is completely collapsed upon itself, and a compression spring disposed about the lower portion of said stem and within said float chamber continually acting against the float to yieldingly restrain buoyancy thereof as said float is raised by flow of liquid from the container into said chamber.

6. In a gauge for a liquid container, a member supported in connection with and extending above the container and having indicia thereon, a float chamber extending into the container and having supported connection therewith at its upper end and an indicating mechanism consisting of a buoyancy type float disposed in said chamber, said float being subject to immersion in the liquid of the container in varying depths in accordance with changes in the depth of said liquid, a stem connected to said float that has movement into said housing having an indicating member secured on its upper end, a head member in the lower end of said housing, an expansion spring disposed about the upper portion of said stem and between said indicating member and said head member in the lower end of said housing, said spring acting upwardly against the indicating member, and a compression spring disposed about the lower portion of said stem and arranged between said float and the upper end of said float chamber, said compression spring acting continually and downwardly on the float, said expansion spring, when collapsed completely, being adapted to definitely limit downward movement of the indicating mechanism whereby the float is held suspended when the container is empty and said float is at its lowest position.

ROBERT W. HARPER.

References Cited in the file of this patent

UNITED STATES PATENTS

| Number | Name | Date |
|---|---|---|
| 706,505 | Washington | Aug. 5, 1902 |
| 1,193,744 | Wilkinson | Aug. 8, 1916 |
| 1,590,287 | De Giers | June 29, 1926 |
| 1,712,794 | Jarvis | May 14, 1929 |

FOREIGN PATENTS

| Number | Country | Date |
|---|---|---|
| 6,936 | Great Britain | 1915 |
| 533,737 | France | Mar. 9, 1922 |
| 568,704 | France | Mar. 31, 1924 |